Dec. 5, 1961  R. BERGSMA  3,011,351
SPEEDOMETER
Filed March 5, 1957  3 Sheets-Sheet 2
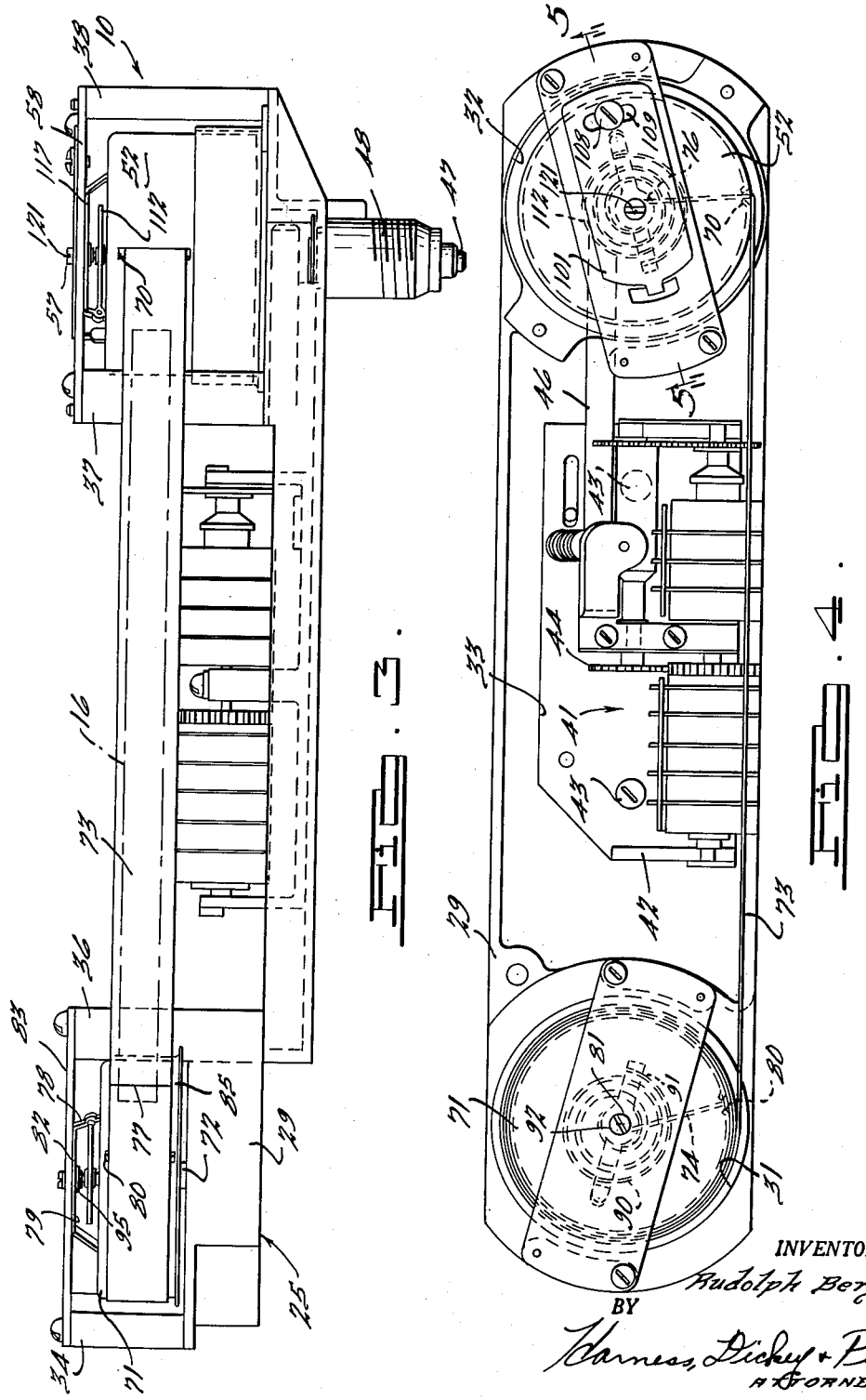
INVENTOR.
Rudolph Bergsma
BY
Harness, Dickey & Pierce
ATTORNEYS.

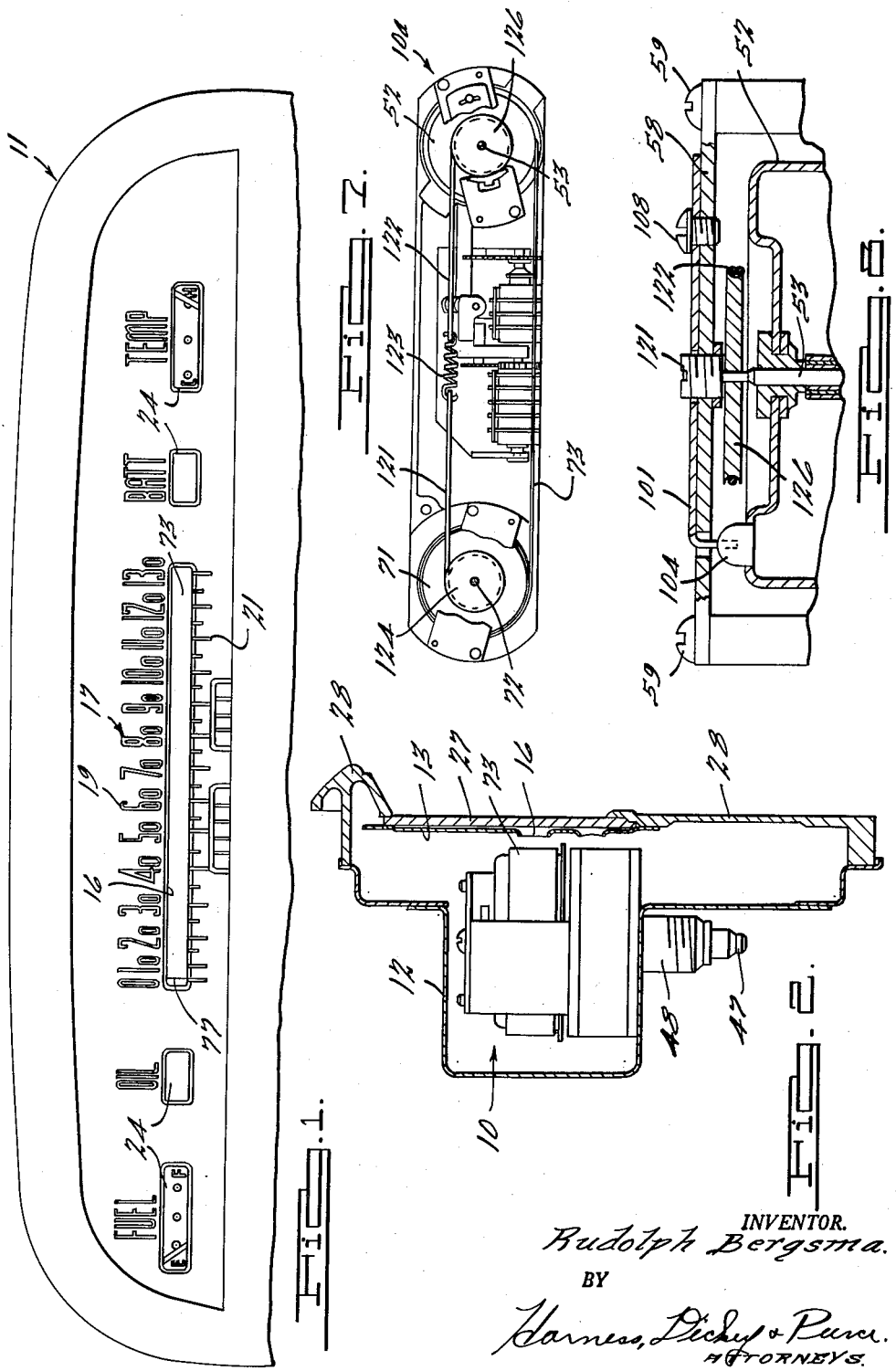

Dec. 5, 1961  R. BERGSMA  3,011,351
SPEEDOMETER
Filed March 5, 1957  3 Sheets-Sheet 3

INVENTOR.
Rudolph Bergsma.
BY
Harness, Dickey & Pierce.
ATTORNEYS.

United States Patent Office 3,011,351
Patented Dec. 5, 1961

3,011,351
SPEEDOMETER
Rudolph Bergsma, Ann Arbor, Mich., assignor to King-Seeley Thermos Co., a corporation of Michigan
Filed Mar. 5, 1957, Ser. No. 643,968
2 Claims. (Cl. 73—519)

This invention relates generally to indicating and measuring devices and more particularly to an improved speedometer for indicating and measuring the speed of a vehicle.

An object of this invention is to provide an improved measuring device.

Another object of this invention is to provide a speedometer which includes improved means for translating a rotary motion to a rectilinear motion so that the rectilinear motion is substantially proportional to the rotary motion.

A further object of this invention is to provide an improved speedometer in which a ribbon-type indication is associated with a rectilinear graduated scale.

A further object of this invention is to provide a ribbon-type speedometer which incorporates means for maintaining the tension in the ribbon type indicating means thereof substantially constant during sudden starting and stopping movements of the vehicle.

Yet a further object of this invention is to provide an improved speedometer which is simple and rugged in construction, economical to manufacture and install, and efficient and reliable in operation over a prolonged service life.

Further objects, features and advantages of this invention will become apparent from a consideration of the following description, the appended claims and the accompanying drawing in which:

FIG. 1 is a front elevational view of an automobile speedometer installation which includes the present invention;

FIG. 2 is a side elevational view of the installation shown in FIG. 1, with some parts broken away and other parts shown in section for the purpose of clarity;

FIG. 3 is a front elevational view of the speedometer illustrated in FIG. 1 with the dial plate removed;

FIG. 4 is a top plan view of the speedometer shown in FIG. 3;

FIG. 7 is a top plan view, illustrated similarly to FIG. 4, and with some parts broken away, of a modified form of speedometer of this invention; and FIG. 8 is a fragmentary enlarged sectional view, illustrating similarly to FIG. 5, of a portion of the modified speedometer illustrated in FIG. 7.

Figure 5:
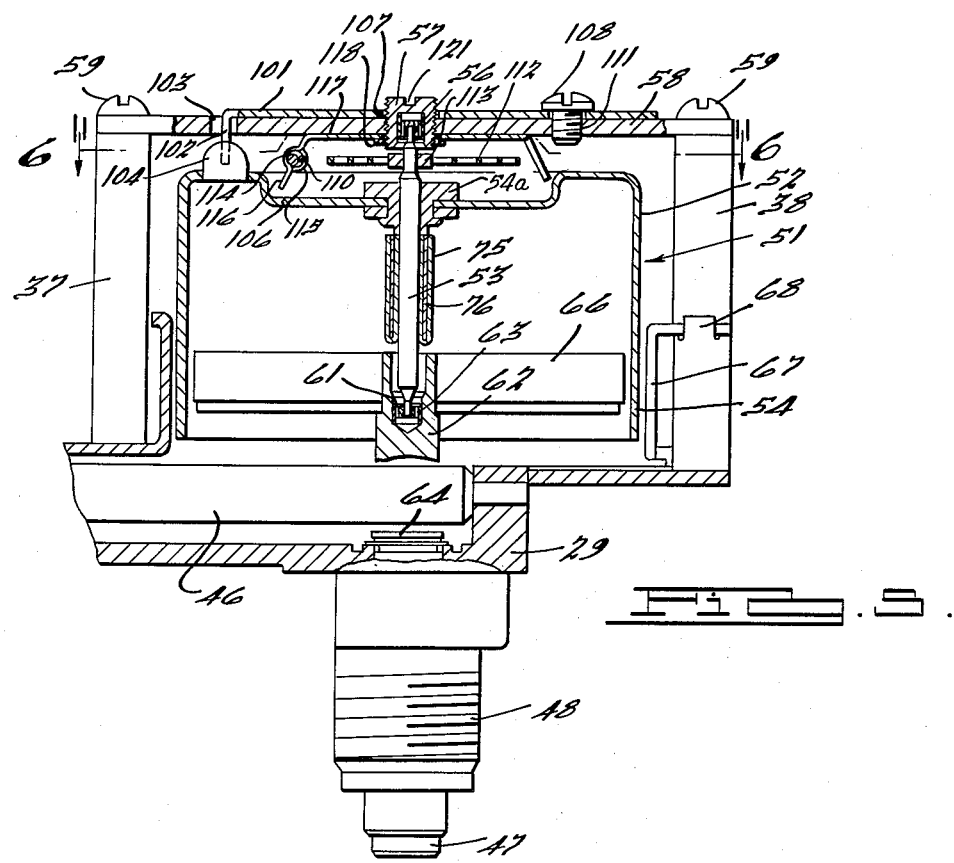
FIG. 5 is an enlarged transverse sectional view looking along the line 5—5 in FIG. 4.
Figure 6:
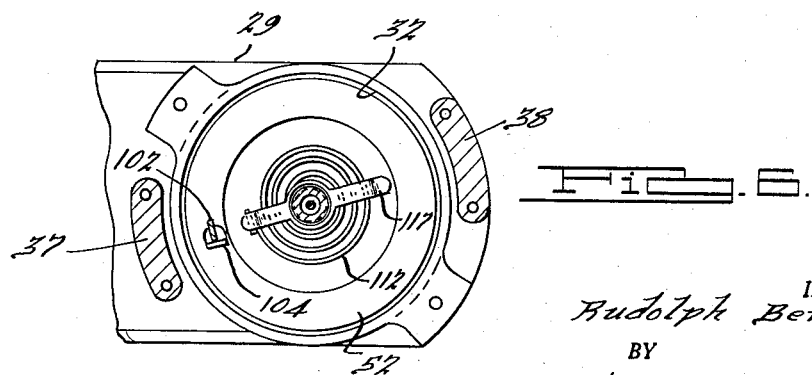
FIG. 6 is a reduced fragmentary sectional view looking along the line 6—6 in FIG. 5.

With reference to the drawing, the speedometer of this invention, indicated generally at 10, is illustrated in FIGS. 1 and 2 incorporated in an instrument panel installation, indicated generally at 11, particularly adapted for use on an automotive vehicle, although it is to be understood that the present invention is applicable to other uses and to other types of indicating and measuring devices.

The instrument panel installation 11 includes a mounting housing 12 (FIG. 2) which is adapted to be secured to the dash panel (not shown) or other mounting panel on the vehicle by any suitable or conventional means. A dial plate 13 is provided which includes an elongated substantially straight slot 16. A rectilinear scale 17 is provided on the dial plate 13 adjacent the slot 16, with the scale 17 including substantially equally spaced graduations 21 and suitable indicia 19 denoting uniform increments of speed. If desired, the installation 11 may also be provided with suitable gauges and signalling devices, such as those indicated at 24, responsive to various operating conditions of the vehicle. For example, gauges and signalling devices responsive to the fuel level, oil pressure, engine temperature and battery condition may be mounted in the housing 12 opposite suitable apertures in the dial plate 13 so that the operator of the vehicle may view the gauges and signalling devices for an indication of the operating conditions of the vehicle.

A transparent closure 27 is provided for the installation 11 in order to protect the speedometer and gauges from dust and the like, with the closure 27 being disposed in a spaced substantially parallel relationship with the dial plate 13. A molding 28 which also serves to provide a finished and pleasing appearance for the installation retains the closure 27 in a desired fixed position.

The speedometer 10 is mounted within the housing 12 and includes a frame, indicated generally at 25, having a base 29 (FIGS. 3 and 4) which is preferably formed of zinc or other suitable material of sufficient strength to withstand the forces normally applied to the base 29. At a position adjacent the opposite ends thereof, the base 29 is provided with a pair of recesses 31 and 32, of a substantially circular shape, and the central portion of the base includes a substantially rectangular recess 33. The frame 25 also includes a pair of vertically extending support walls 34 and 36 located on opposite sides of the recess 31 and a similar pair of vertically extending support walls 37 and 38 arranged on opposite sides of the recess 32, with the walls 34, 36, 37 and 38 being integral with the base 29.

An odometer mechanism 41 (FIG. 4) is provided which is mounted on a frame 42 disposed in the recess 33 and secured to the base 29 by screws 43. The odometer mechanism 41 is driven through a suitable gear train 44 by a shaft 46, the opposite end of which is drivably connected to a cable 47 that extends into a fitting 48 (FIG. 3) projected downwardly from the base 29.

As best appears in FIG. 5, the speedometer 10 includes a magnetic drive indicated generally at 51 which includes a speed cup or drum 52 which is fixed to a spindle 53 by a hub member 54a. One end of the spindle 53 is journaled for rotation in a bearing 56 carried by a screw threaded member 57 threadably received in a support plate 58. The opposite ends of the support plate 58 are fixed to the upper ends of the walls 37 and 38 by screws 59. The spindle 53 extends into an axial recess 61 in a shaft 62 and is journaled in a bearing 63 mounted in the inner end of the recess 61. The shaft 62 is journaled for rotation in a bearing 64 carried by the base 29 and is provided with suitable teeth which engage and mesh with teeth on the shaft 46 that drives the odometer mechanism. The shaft 62 is also drivably coupled to the speedometer cable 47 in any desired or conventional manner so that the shaft 62 is driven at the same speed of rotation as the speedometer cable.

The magnetic drive 51 also includes a magnet 66 which is fixed to the shaft 62 and a pole piece 67 fixed to the wall 38 as at 68. The drum 52 includes a peripheral flange portion 54 which is disposed between the magnet 66 and the pole piece 67 so that rotation of the magnet 66 generates eddy currents in the drum 52 that cause the drum to rotate about the axis of the spindle 53. Since the magnet 66 rotates at a speed which is proportional to the speed of the vehicle, by virtue of its assembly on the shaft 62, the angular movement or rotation of the drum 52 is proportional to the speed of the vehicle.

At the opposite end of the base 29, a second drum 71 (FIGS. 3 and 4) is rotatably mounted on a spindle 72 carried by the base 29 at a position within the recess 31.

A relatively thin, flexible, tape-like indicating member 73 has one end portion 76 secured, by a retaining element 75 (FIG. 5), to the spindle 53. The element 75 is described in detail in the co-pending application of Emil E. Sivacek, Serial No. 541,186, now Patent No. 2,953,026, filed October 18, 1955 and assigned to the assignee of the present invention. The tape 73 extends out of the drum 52 through a slot 70 in the flange 54 of the drum 52 and extends longitudinally of the base 29 for winding about the drum 71. The opposite end portion 74 of the tape 73 extends through a slot 80 formed in the drum 71 at a position horizontally opposite the slot 70, and is secured to the spindle 72 in the same manner that the end portion 76 thereof is secured to the spindle 53. It is preferred that the tape be relatively thin, in the order of one one-thousandths of an inch thick and that the tape have relatively high impact and tensile strength characteristics. It is also preferred that the tape maintain its flexibility throughout a wide temperature range and have subtsantially the same coefficient of expansion as the base 29. With such a construction, the operation of the speedometer 10 is not affected by changes in the ambient temperature. One material suitable for this purpose is marketed under the trade name "Mylar," by the E. I. du Pont de Nemours Company, Wilmington, Delaware. It is understood that this material is a polyester film.

Since the tape 73 extends through the slot 70 in the drum 52 and is wrapped about the drum 71, when angular displacement of the drum 52 is effected by rotation of the magnet 66, the tape 73 winds onto the flange portion 54 of the drum 52 and unwinds from the flange portion 85 of the drum 71, the tape moving longitudinally relative to the slot 16 and the scale 17 (FIG. 1). As best appears in FIGS. 1, 2 and 3, the tape 73 is aligned with the slot 16 in the dial plate 13, the tape 73 being substantially parallel to the plate 13 for viewing through the slot 16. The tape 73 is provided with a reference line 77 (FIG. 1) which extends transversely of the tape in a direction substantially perpendicular to the longitudinal edge portions thereof and which may, for example, be a dividing line between sections of tape of contrasting color. The reference line 77 may also be a slot in the tape 73 or it may be a dividing line between opaque and transparent sections of the tape. As the tape moves longitudinally of the slot 16, the reference line 77 also moves longitudinally of the scale 17 and is visible through the slot 16 so that the reference line may be associated with the scale to indicate changes in the speed of the vehicle.

For initially adjusting the reference line 77 relative to the scale 17, an adjusting plate 101 (FIGS. 4 and 5) is mounted on the top side of the plate 58 and provided with a depending tang portion 102 projected downwardly through an opening 103 in the support plate 58. The tang portion 102 extends downwardly to a position in which it is engageable with an upstanding flange 104 struck upwardly from the top wall 106 of the drum 52. The plate 101 is provided with an opening 107 through which the threaded member 57 projects to provide for angular movement of the plate 101 about the member 57. The plate 101 is held in an angularly adjusted position by a screw 108 extended downwardly through an arcuate slot 109 in plate 101 and received in a threaded opening 111 in the plate 58.

A spring 112 secured at its inner end to a block 113 fixed to the spindle 53 is wound about the block 113 and has its outer end 110 frictionally clamped between a pair of struck out portions 114 and 115 formed in the downturned flange portion 116 of an inverted generally U-shape abutment stop member 117 positioned about the threaded member 57 at a position below the support plate 58. A nut 118 threaded on the lower end of the threaded member 57 is advanced into tight frictional engagement with the abutment stop 117 to clamp the stop 117 between the nut 118 and the plate 58. By relative manipulation of the nut 118 and threaded member 57, which is conveniently provided with a slot 121 for receiving a screw driver or the like, the nut 118 may be loosened for angular rotational adjustment of the member 117 to in turn adjust the torsional force exerted on the drum 52 by the spring 112.

As best appears in FIGS. 3 and 4, the spring 112 exerts a rotational force on the drum 52 in a direction corresponding to the direction of rotation of the drum 52 in response to rotation of the magnet 66, namely, counterclockwise as viewed in FIG. 4. As best appears in FIG. 3, such rotational movement of the drum 52 winds the tape 73 about the drum 52.

In order to provide a restoring force on the drum 71 opposite to the direction of the force exerted by the spring 112, a flat spiral-shaped hair-spring 90 like the spring 112 is positioned about the spindle 72 for the drum 71. The outer end 91 of the spring 90 bears against a downturned flange 78 formed on an adjustable abutment stop 79 identical with the previously described stop 117 (FIG. 5). The opposite or inner end of the spring 90 is fixed to the spindle 72 in a manner identical to the manner in which the inner end of the spring 112 is fixed to its corresponding spindle 53. The abutment stop 79 is likewise adjustably clamped to the plate 83 by a threaded member 92 and a nut 95 so that the spring 90 exerts a rotational force on the drum 71 in a clockwise direction as viewed in FIG. 4. The magnitude of this force is adjustable in the same manner that the force of the spring 112 on the drum 52 is adjustable.

The clockwise force on the drum 71 results in a pulling force on the tape 73 extended longitudinally of the tape and directed toward the left as viewed in FIG. 4. On the contrary, the spring 112 exerts a counter-acting force to the right on the tape 73. As a result, the springs 90 and 112 coact to continually maintain the tape 73 in a tight condition extended between the drums 52 and 71. Without the spring 112, there is a tendency for the tape 73 to become loose between the drums in the event the speed of the vehicle is suddenly reduced. In those cases, the force to the right on the drum 73 suddenly drops from a substantial force to a small force and the spring 90 acts to snap the tape 73 toward the left as viewed in FIG. 4 resulting in a momentary waving or flopping of the tape. The spring 112 eliminates this condition and provides for a continual tension in the tape 73 even under zero speed conditions. The tension in the springs 90 and 112 is adjusted such that for any speed condition, the torque exerted on the drum 52 by the magnet 66 and the spring 112 is equal to the counter-acting torque exerted on the drum 71 by the spring 90.

In the operation of the speedometer, when the vehicle is moving, the magnet 66 and the pole piece 67 effect angular movement of the drum 52 in a counter clockwise direction as viewed in FIG. 4, with the extent of the angular movement of the drum 52 being directly proportional to the speed of the vehicle. For example, the drum 52 may rotate through an angle of sixty degrees when the vehicle speed is increased from zero to sixty miles per hour. As the drum 52 rotates, the tape 73 will unwind from the flange 85 of the drum 71 so that the reference line 77 moves longitudinally of the scale 17, with the line 77 being visible through the slot 16. As the tape 73 unwinds from the drum 71, the drum 71 will also rotate through an angle equal to the angular displacement of the drum 52. Assuming that the sections of the tape on opposite sides of the line 77 are of contrasting color, as, for example, red on the left hand side of the line 77 and black on the right hand side, a red pattern will then move longitudinally of slot 16 toward the drum 52.

If desired a suitable source of light may be provided behind the tape 73, the light passing through the tape to provide an illuminated indication of the speed of the vehicle. In addition, instead of the line a slot may be provided in the tape so that a relatively bright beam of light passes through the tape at the slot. Furthermore, one section of the tape may be made opaque and the other section transparent so that an illuminated ribbon of light moves longitudinally of the slot 16 as the speed of the vehicle varies.

When the speed of the vehicle is reduced, the torque applied to the drum 52 by the magnet 66 and the pole piece 67 is reduced and the spring 90 will cause the drum 71 to rotate in a clockwise direction as viewed in FIG. 4. Accordingly, the tape 73 will wind onto the flange 85 of the drum 71 and will cause the drum 52 to rotate in a clockwise direction to restore the drum to the angular position corresponding to the speed of the vehicle. This clockwise rotation of the drums 71 and 52 is continually resisted by the spring 112 which thus acts to maintain tension in the tape 73 at all times and provide for an accurate representation on the scale 17 of the vehicle speed.

It is preferred that the mass of the drums 52 and 71 and of the tape 73 be relatively low and that the magnet 66 be relatively strong. Since the drums 52 and 71 rotate about parallel axes which are substantially vertical, the drums 52 and 71 and the tape 73 are stabilized against oscillation, due to the fact that acceleration and deceleration forces normal to the tape and vertical components forces caused by pitching or bouncing of the vehicle will not cause any substantial oscillation of the drums or the tape. It will be appreciated that acceleration and deceleration forces and forces produced by pitching and bouncing of the vehicle are the predominant forces exerted on automotive vehicles, with the forces produced by yawing or sidewise motion being relatively rare.

A modified form of the speedometer of this invention is illustrated in FIG. 7 and indicated generally by the numeral 10a. Since the speedometer 10a is identical in most respects to the speedometer 10 described above, like numerals are used to indicate like parts on the speedometers 10 and 10a. The speedometer 10a includes a pair of string or cable members 121 and 122 corresponding to the drums 71 and 52, respectively. The string 121 is wound about a pulley 124 secured to the spindle 72 for the drum 71 and extends toward the other drum 52. Likewise, the string 122 is wound about a pulley 126 secured to the spindle 53 for the drum 52 and extended toward the drum 71. As shown in FIG. 8, the pulley 126 is positioned above the drum 52 and the pulley 124 is similarly positioned relative to its corresponding drum 71. The free ends of the strings 121 and 122 are connected to opposite ends of a coiled spring 123 which thus acts to continuously exert a counterclockwise rotational force on the drum 52 and a clockwise rotational force on the drum 71. The spring 123 thus acts in the speedometer 10a as a replacement for the spring 112 in the speedometer 10 in continuously maintaining the tape 73 under tension. The spring 90 for re-winding the tape about the drum 71 is, of course, assembled in the speedometer 10a in the manner described above in connection with the speedometer 10 so that the operation of the speedometers 10 and 10a is identical in all respects.

Although the invention has been described with respect to a preferred embodiment thereof, it is to be understood that it is not to be so limited, since changes can be made therein which are within the scope of the invention as defined by the appended claims.

What is claimed is:

1. A measuring device comprising: a frame; a pair of drums mounted on said frame for rotation about substantially parallel axes; a thin elongate tape member attached to and extending between said drums for winding movement around said drums; means for applying to one of said drums a torque proportional to the intelligence being measured; first means acting between said frame and said one of said drums for applying a continuous additional torque to the latter in the same direction as said first mentioned torque; and second means acting between said frame and the other of said drums for applying a continuous counterdirectional torque to the latter, whereby said tape member will be maintained in tension and the position thereof with respect to said drums will represent the intelligence being measured.

2. A speedometer comprising: a frame; a pair of drums mounted on said frame for rotation about substantially parallel axes; a thin elongate tape member attached to an extending between said drums for winding movement around said drums; means for applying to one of said drums a torque proportional to the speed being measured; first spring means acting between said frame and said one of said drums for applying a continuous additional torque to the latter in the same direction as said first mentioned torque; and second spring means acting between said frame and the other of said drums for applying a continuous counterdirectional torque to the latter, said first and second spring means being so arranged that the torque exerted by said second spring means is greater than the torque exerted by said first spring means, whereby said tape member will be maintained in tension and the position thereof with respect to said drums will represent the speed being measured.

References Cited in the file of this patent

UNITED STATES PATENTS

| 1,147,329 | Leathers | July 20, 1915 |
| 1,215,209 | Simpson | Feb. 6, 1917 |
| 1,315,501 | Hornik et al. | Sept. 9, 1919 |
| 1,860,678 | Langley | May 31, 1932 |

FOREIGN PATENTS

| 17,340 | Germany | Feb. 9, 1956 |
| 926,329 | Germany | Apr. 14, 1955 |
| 411,713 | Great Britain | June 14, 1934 |
| 533,787 | Italy | Sept. 27, 1955 |

UNITED STATES PATENT OFFICE
CERTIFICATION OF CORRECTION

Patent No. 3,011,351 December 5, 1961

Rudolph Bergsma

It is hereby certified that error appears in the above numbered patent requiring correction and that the said Letters Patent should read as corrected below.

Column 1, line 20, for "indication" read -- indicator --; lines 53 and 54, for "illustrating" read -- illustrated --; column 6, line 30, for "an" read -- and --.

Signed and sealed this 24th day of April 1962.

(SEAL)
Attest:

ESTON G. JOHNSON
Attesting Officer

DAVID L. LADD
Commissioner of Patents